May 16, 1933.  E. W. SCHELLENTRAGER  1,909,724
RECORDING MEANS FOR MATERIALS HANDLING SYSTEMS
Filed Dec. 26, 1931   2 Sheets-Sheet 1
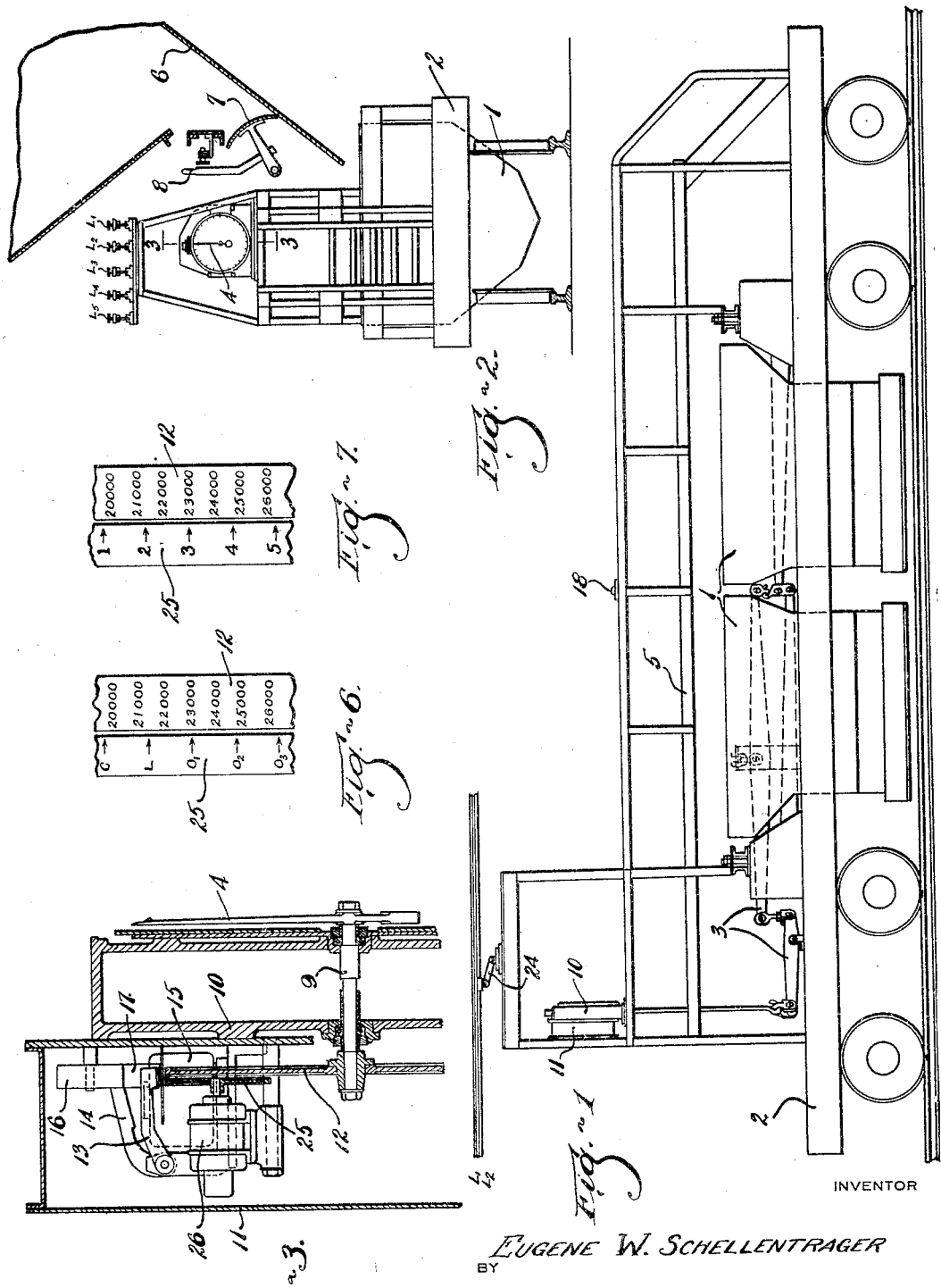
INVENTOR
*Eugene W. Schellentrager*
BY
*Brockett, Hyde, Higley & Meyer*
ATTORNEYS May 16, 1933.  E. W. SCHELLENTRAGER  1,909,724
RECORDING MEANS FOR MATERIALS HANDLING SYSTEMS
Filed Dec. 26, 1931   2 Sheets-Sheet 2
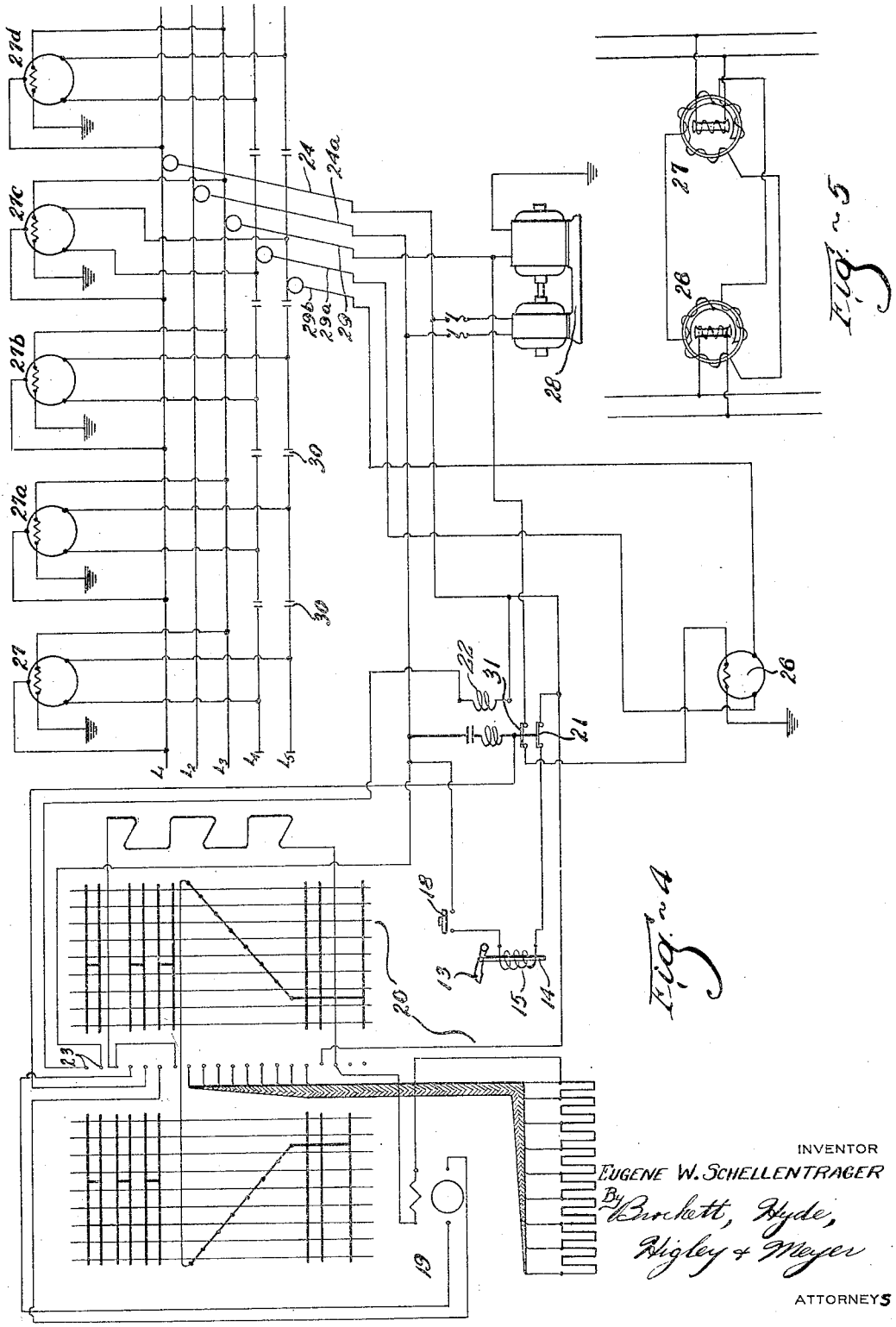
INVENTOR
EUGENE W. SCHELLENTRAGER
By Burkett, Hyde,
Higley & Meyer
ATTORNEYS Patented May 16, 1933

1,909,724

UNITED STATES PATENT OFFICE

EUGENE W. SCHELLENTRAGER, OF SHAKER HEIGHTS, OHIO, ASSIGNOR TO THE ATLAS BOLT & SCREW COMPANY, OF CLEVELAND, OHIO, A CORPORATION OF OHIO

RECORDING MEANS FOR MATERIALS HANDLING SYSTEMS

Application filed December 26, 1931. Serial No. 583,179.

This invention relates to recording scales such as are used in blast furnaces, coke plants and elsewhere for weighing and recording the weights of heavy loads of raw materials delivered to any container of either stationary or movable type, such as a material handling or measuring bin or container or a movable skip or car.

Its object is to provide improved mechanism which not only weighs the material but also records its weight in characters, such as numbers, which themselves, rather than by their position on the record, indicate the weight, and which also supplements the record of each weight by a neighboring printed indication of the material or of the character of the material in the particular lot, either by directly indicating the character of material or the source, such as the bin or group of bins from which it comes.

A further object is to provide a weighing and recording scale including printing mechanism for producing alongside of each other on a single record both a readable record of weight and a legend identifying the character of material or its source.

A further object is to provide improved mechanism of this kind capable of remote control either manually or automatically, and in the latter case an automatic control associated with operation of the container for collecting the material.

Still another object is to provide automatic control mechanism for a system of this kind adapted for use on a moving container, such as a dump car, and in which the scale mechanism and weight recording parts operate as usual, while the material defining and recording parts are automatically controlled to differentiate between materials, and the recording mechanism for both weight and material is operator controlled, but nevertheless may be associated with the car operating mechanism to work in harmony therewith, neither interfering with ordinary car operation nor being interfered with thereby.

A further object is to provide improved weight recording apparatus, including a weight responsive type wheel and an adjacent material-identifying type wheel, together with a single record strip overlying both type wheels, and a single hammer to simultaneously cause impression of both wheels upon the record strip.

Further objects of the invention are in part obvious and in part will appear more in detail hereinafter.

In the drawings, which represent the invention applied for use on a dump car, Fig. 1 is a more or less conventionalized side elevation of the dump car; Fig. 2 is an end view of the car and showing also, in section, a bin from which the car may be loaded; Fig. 3 is an enlarged view partly in section on the line 3—3, Fig. 2, showing details of the indicating and recording apparatus; Fig. 4 is an elementary wiring diagram of a selsyn transmitter-indicator set; Fig. 5 is a wiring diagram for the car and bin mechanism shown in Figs. 1 and 2; Fig. 6 is a detail development of portions of the printing wheels; and Fig. 7 shows another arrangement.

While the invention is capable of use on either stationary or movable weighing containers, as stated above, for purposes of illustration and in no sense of limitation it has been shown applied to a dumping railway car such as is used in conveying raw materials to the skip hoist of a blast furnace. The dump car is therefore of large size and of considerable length and in its operation the operator moves to various positions along the usual runway, 40 feet or more in length, with which the car is provided. The indicating and recording parts of the weighing mechanism, on the other hand, are most conveniently fixed at one end of the car so that remote control of the weighing and recording parts is highly desirable.

The car travels along a way between a dumping position and a plurality of loading positions where it receives loads of different materials. Obviously a weight record of successive loads would have little value unless the record also includes identification of the nature of each load.

The car contemplated by this invention is loaded from a number of bins or groups thereof containing the different load materials and of course the various loading positions of the car are determined by the locations of the bins or groups along the car way. As a further part of this invention the character of material may be identified in the record by its source. Knowing the nature of the contents of each bin or group, an indication in the record of the bin or group in effect identifies the material being weighed. Further, by causing material identification in the record to be automatically responsive to the loading position of the car, the operator is relieved of the duty of manipulating a material-indicating selector before causing actuation of the recording apparatus, as will further appear.

The car of course is power driven and, that the record may be produced only when the car is at a loading position and consequently not in motion, I so associate the record-producing control with the car-operating control that when driving power is being applied to the car the record-producing control is ineffective.

This result may be obtained in any suitable manner, or by any suitable means. For convenience, but in no sense of limitation, the drawings show the result obtained by the use of self-synchronous motors, commonly known as selsyn motors, interconnected in pairs of which one is operated at any sending point as a generator and serves as the transmitter, while the other operates at the receiving point as a motor and serves as the indicator. According to my invention I provide a plurality of selsyn transmitters, one for each loading position or a group thereof, containing the same or similar materials. These transmitters all have their rotors fixed, but each rotor is indexed to a definite position indicative of the particular material. On the car I provide a single selsyn indicator associated with the material identifying indicator of the recording apparatus. Contactors are then arranged to connect the selsyn indicator with the corresponding selsyn transmitter when the car is at any loading position. The selsyn indicator is also so associated with the car control that the indicator will not be responsive to any of the transmitters while the car is under power.

With reference now to the drawings, the car includes one or more dumping hoppers 1 supported on the car frame 2 by means of a system of scale levers generally designated at 3 and connected to a pointer 4 movable over a suitable dial, by which the weight of any load contained in the hoppers 1 is determined and visually indicated.

The details of the scale mechanism are immaterial here, where it will suffice to state that the pointer 4 is mounted upon a spindle 9 bearing in the housing 10 which encloses some of the scale mechanism, and further extends into another housing 11 which encloses recording mechanism as will appear. Upon the spindle within this second housing is mounted a type wheel 12 bearing upon its periphery a series of type figures, as in Fig. 6, corresponding to the range of weight of the loads to be handled. Adjacent the type wheel 12 is a hammer 13 arranged to be actuated thereagainst by means of an armature 14 upon energization of a solenoid coil 15. The type wheel 12 of course turns or is indexed with the pointer 4 so that the weight-indicating number opposite the hammer 13 always corresponds with the weight indicated by the position of the pointer 4. A roll of paper record strip 16 is provided from which the strip is led as at 17, between the hammer 13 and the type face of the wheel 12, and thence onto a collector roll through suitable feeding mechanism details of which are immaterial here. The record strip may be prepared to receive impression from the type of the wheel 12 when struck thereagainst by the hammer 13, or for the same purpose it may include an associated strip of carbon paper, or an equivalent inking ribbon or other device may be employed. It is sufficient that it be understood that upon energization of the solenoid coil 15 the record strip will receive the imprint of the type face of the wheel 12, which imprint indicates the same weight indicated by the pointer 4 at the instant of impression. The record strip may be advanced step by step by any suitable feeding means so that successive imprints will be spaced at intervals.

The long car is equipped with a runway 5 for the operator, at the end of which is located the scale with its weight-indicating pointer 4. The car is movable along a way between a number of loading positions at each of which are provided bins 6 arranged to discharge into the car. The bins are provided with gates 7 actuated in any suitable manner, such as by handles 8 by which the loading of the car hoppers may be controlled. The handles 8 of a bin are arranged to be accessible to an operator on the car runway 5 when the car is in such position that its hopper will receive the bin discharge; but it will be observed that the operator at the handle 8 is more or less remote from the weight-indicating and recording apparatus. Therefore, that the solenoid 15 may be energized by the operator when located adjacent the handles 8, a push button 18 or other suitable switch means is conveniently located upon the car as indicated Fig. 1, in circuit with the coil 15, Fig. 5.

The car is power driven as by an electric motor 19 whether the motor be located upon the car or elsewhere. The car drive is controlled through manipulation of the usual controller having the usual plurality of contactors and associated resistance all generally designated in Fig. 5 by the reference character 20.

In the drawings the power supply for the car comes by way of the controller from the line L1, L2; and if the motor 19 be on the car the usual trolleys 24, 24a, are employed.

To prevent energizing the coil 15 of the recording mechanism while the car is under power, I provide a relay switch 21 in circuit with the coil 15 and controlled by the coil 22 which in turn is in circuit with the contactor 23 of the controller 20.

Means for identifying the material of the load, and for recording the identification simultaneously with the recording of the weight of the load, are provided as follows:

Immediately adjacent the type wheel 12 is mounted a material type wheel 25 so arranged that its type face underlies the hammer 13 and the same record strip overlying the type wheel 12. The face of the wheel 25 bears a plurality of indications corresponding with the different materials which the car is to handle, or with suitable indicia of the bins from which the car is to be loaded. Fig. 6 shows the legends C for coke, L for limestone, and $O_1$, $O_2$ etc. for different kinds of ore, each having an adjacent arrow which in the indexed position of the material wheel becomes the zero mark for indicating which of the number legends is the correct weight, when because of large diameter of wheel 12 a given impression reproduces two or more of the weight numbers. Fig. 7 shows another arrangement in which the material is identified by the number of the bin from which it comes. The wheel 25 is secured with the rotor of a selsyn or self-synchronous motor 26.

This motor 26 is adapted for electrical association with a similar motor 27 as indicated in Fig. 5; from which it will be observed that these motors are similar to three-phase induction motors but have shuttle-wound rotors with definite poles, the windings of which are connected to a single-phase alternating current source of excitation. The arrangement, which is well known in the art, provides that one of these motors, 27, at a sending point and serving as transmitter, may be operated as a generator, while the other motor, 26, located at the receiving point and serving as indicator acts as a motor. When the motor excitation circuit is closed, an alternating current voltage is impressed on the rotors of both the transmitter and the indicator. If the indicator rotor is free to turn, it will assume a position similar to that of the transmitter rotor.

According to my invention I provide such a selsyn transmitter 27 to control the indicator 26 and thus the load-indicating wheel 25. This transmitter may be arranged for operator control adjacent the switch 18, whereby the operator may present the recording device to properly identify the load before the record is effected by closing of the switch 18.

But preferably I provide a plurality of such selsyn transmitters 27, 27a, 27b, 27c, 27d, one associated with each of the bins or groups thereof from which the car is to be loaded. Also I provide that, when the car is stationary in loading position with respect to any bin, the corresponding selsyn transmitter has such an operative connection with the selsyn indicator 26 as is indicated in Fig. 4. In addition I index and fix, at different angular positions around the center, the rotors of the transmitters 27 for the different bins or sources so as to correspond with the positions of the bin indicia upon the load-indicating wheel 25 of the recording device; so that when the indicator 26 has connection with any of the transmitters 27, an imprint made from the two type wheels 25 and 12 will include an indication corresponding with the connected selsyn transmitter 27, and hence properly indicate the source of the load and consequently the character of its material.

Fig. 4 shows the car as propelled from a direct current source, but obviously the selsyn system requires an alternating current source. Therefore, I provide the motor generator set 28 for supplying the necessary alternating current for the selsyn system. As this system requires five connections between transmitter and indicator, I use the ground and a third trolley line L3 for two of the connections, those of the rotors of the selsyn motors. I also use L1 of the direct current line for one of the three stator connections of the selsyn system. For the other two stator connections I provide lines L4 and L5. There are thus three additional trolley wires required and similarly the three additional trolleys 29, 29a and 29b, or five in all of each, as shown in Figs. 2 and 5.

The lines L4 and L5 are interrupted between transmitters 27, by short insulating segments, as at 30, so that the indicator 26 may have connection with but one of the transmitters at a time, but the trolleys all run on continuous surfaces without click.

That none of the transmitters 27 may have connection with the motor 26 to actuate the latter when the car is merely travelling past the corresponding bin, I provide a switch 31 in the circuit of the selsyn transmitter and associate this switch with the same relay which controls the switch 21. Thus, whenever the car is under power the selsyn circuit system will be incomplete and the indicator 26 will not be responsive to any of the transmitters. The switch 31, however, is not essential and may be omitted if desired.

What I claim is:

1. In a weight recording apparatus, weight indicating means, means arranged for indicating the material weighed, means arranged for control of said material indicating means from a remote location, and means for simultaneously recording both said indications.

2. In a weight-recording apparatus, weight-indicating means, means arranged for control from a remote location for indicating the material weighed, said means comprising a remote operator-controlled selsyn transmitter and a selsyn indicator associated therewith and with said weight-indicating means, and means for simultaneously recording both said indications.

3. In a weight-recording apparatus, weight-indicating means, means arranged for operator control from a remote location for indicating the material weighed, and means for simultaneously recording both said indications.

4. In a weight-recording apparatus, weight-indicating means including a movable weight-indicating type member and an associated weighing scale, means for indicating the material weighed and including a movable material indicating type member adjacent said weight indicating type member, a selsyn indicator associated with said material indicating type member for control thereof a selsyn transmitter at a remote location and associated with said selsyn indicator for control of the latter, and means for simultaneously making impressions from both type members to record the indications of both.

In a weight-recording apparatus, weight-indicating means including a weight-indicating type member and an associated weighing scale, means for indicating the material weighed and including a material indicating type member adjacent said weight-indicating type member, a selsyn indicator associated with said material indicating type member for control thereof, a selsyn transmitter at a remote location and associated with said selsyn indicator for control of the latter, and means for simultaneously making impressions from both type members to record the indications of both, said recording means being arranged for control by the operator coincident with his control of said selsyn transmitter.

6. In apparatus of the class described, a weight-indicating type member, an adjacent material indicating type member, means arranged for control of said material indicating type member from a remote location, and means for simultaneously recording the indications of both said members, comprising record-receiving sheet means overlying the type faces of both members, and impression means arranged to effect record-producing contact between said sheet means and both of said type faces.

7. A weighing dump car having weight-indicating means, adjacent means for indicating the material weighed, means arranged for operator control of said material indicating means from a remote location on said car, and means for simultaneously recording both said indications.

8. A weighing dump car having weight-indicating means, adjacent means for indicating the material weighed, and means arranged for operator control from a remote location on said car for simultaneously recording both said indications.

9. A power driven weighing dump car having weight-indicating means, adjacent means for indicating the material weighed, and means arranged for operator control from a remote location on said car for simultaneously recording both said indications, said means being so associated with the driving means of said car that said recording cannot be effected when said car is being driven.

10. A weighing dump car having weight-indicating means, means for indicating the material weighed, means for controlling said indicating means responsive to the position of said car on its way, and means for simultaneously recording both said indications.

11. In combination with a dump car movable along a way between a dumping position and a plurality of loading positions, means for indicating the load material and including control means therefor arranged to be responsive to the loading position of said car, and means for recording said indication.

12. In combination with a dump car movable along a way having a plurality of loading positions, means for indicating the load material and including control means therefor arranged to be responsive to the loading position of said car, and means for simultaneously recording the weight and the material indication.

13. In combination with a dump car movable along a way having a plurality of loading positions, means for identifying load material by the source from which it comes, said means comprising a selsyn indicator, differently indexed selsyn transmitters one for each loading position, and means providing connection between said indicator and the corresponding transmitter dependent upon said car occupying a loading position.

14. In combination with a dump car movable along a way having a plurality of loading positions, means for identifying load material by the source from which it comes, said means comprising a selsyn indicator on said car, differently indexed selsyn transmitters one for each loading position, and means providing connection between said indicator and any corresponding transmitter dependent upon said car occupying a loading position.

15. In combination with a dump car movable along a way having a plurality of loading positions, means for identifying load material by the source from which it comes, said means comprising a selsyn indicator, differently indexed selsyn transmitters one for each loading position, means providing connection between said indicator and any corresponding transmitter dependent upon said car occupying a loading position, and means for recording the indication of said indicator.

16. In combination with a dump car movable along a way having a plurality of loading positions, means for identifying load material by the source from which it comes, said means comprising a selsyn indicator on said car, differently indexed selsyn transmitters one for each loading position, means providing connection between said indicator and any corresponding transmitter dependent upon said car occupying a loading position, and means on said car for recording the indication of said indicator.

17. In combination with a weighing dump car movable along a way having a plurality of loading positions and having load-weight-indicating means, means for identifying load material by the source from which it comes, said identifying means comprising a selsyn indicator on said car, differently indexed selsyn transmitters one for each loading position, and means providing connection between said indicator and any corresponding transmitter dependent upon said car occupying a loading position, and means for simultaneously recording the indications of said weight and said selsyn indicators.

18. In combination with a dump car power driven along a way having a plurality of loading positions, means for identifying load material by the source from which it comes, said means comprising a selsyn indicator on said car, differently indexed selsyn transmitters one for each loading position, and means providing connection between said indicator and any corresponding transmitter dependent upon said car occupying a loading position, said connection means being so associated with the driving means of said car that said connection can not be effected when said car is being driven, and means for recording the indications of said indicator.

In testimony whereof I hereby affix my signature.

EUGENE W. SCHELLENTRAGER.